United States Patent [19]

Nagahara et al.

[11] 3,912,434

[45] Oct. 14, 1975

[54] METHOD AND APPARATUS FOR ADJUSTING THE POSITION OF CUTTER BLADES RELATIVE TO A DIE IN A PLASTIC RESIN PELLETIZING APPARATUS

[75] Inventors: Masao Nagahara, Kamo; Masateru Tatsudan; Yoshihiro Hidaka, both of Aki; Minoru Yoshida, Hiroshima, all of Japan

[73] Assignee: Japan Steel Works Ltd., Tokyo, Japan

[22] Filed: Sept. 4, 1974

[21] Appl. No.: 503,166

[30] Foreign Application Priority Data
Jan. 8, 1974 Japan.................................. 49-5091

[52] U.S. Cl.............. 425/142; 425/313; 241/259.1; 241/37
[51] Int. Cl.²..................... B28B 17/00; A01J 21/02
[58] Field of Search................... 425/142, 311, 313; 241/259.1, 37

[56] References Cited
UNITED STATES PATENTS
3,832,114  8/1974  Yoshida............................ 425/313
FOREIGN PATENTS OR APPLICATIONS
1,449,787  7/1966  France............................. 425/313

*Primary Examiner*—James L. Jones, Jr.
*Attorney, Agent, or Firm*—Wenderoth, Lind & Ponack

[57] ABSTRACT

The position of cutter blades relative to a die in a pelletizing apparatus is adjusted in such a manner that during the advancement of the rotating cutter blades towards the die, when the cutter blades come into contact with the surface of the die, electrical signal pulses are produced, which in turn make the cutter blades move further forward or rewards until a predetermined relative position between the cutter blades and the die is attained.

5 Claims, 6 Drawing Figures

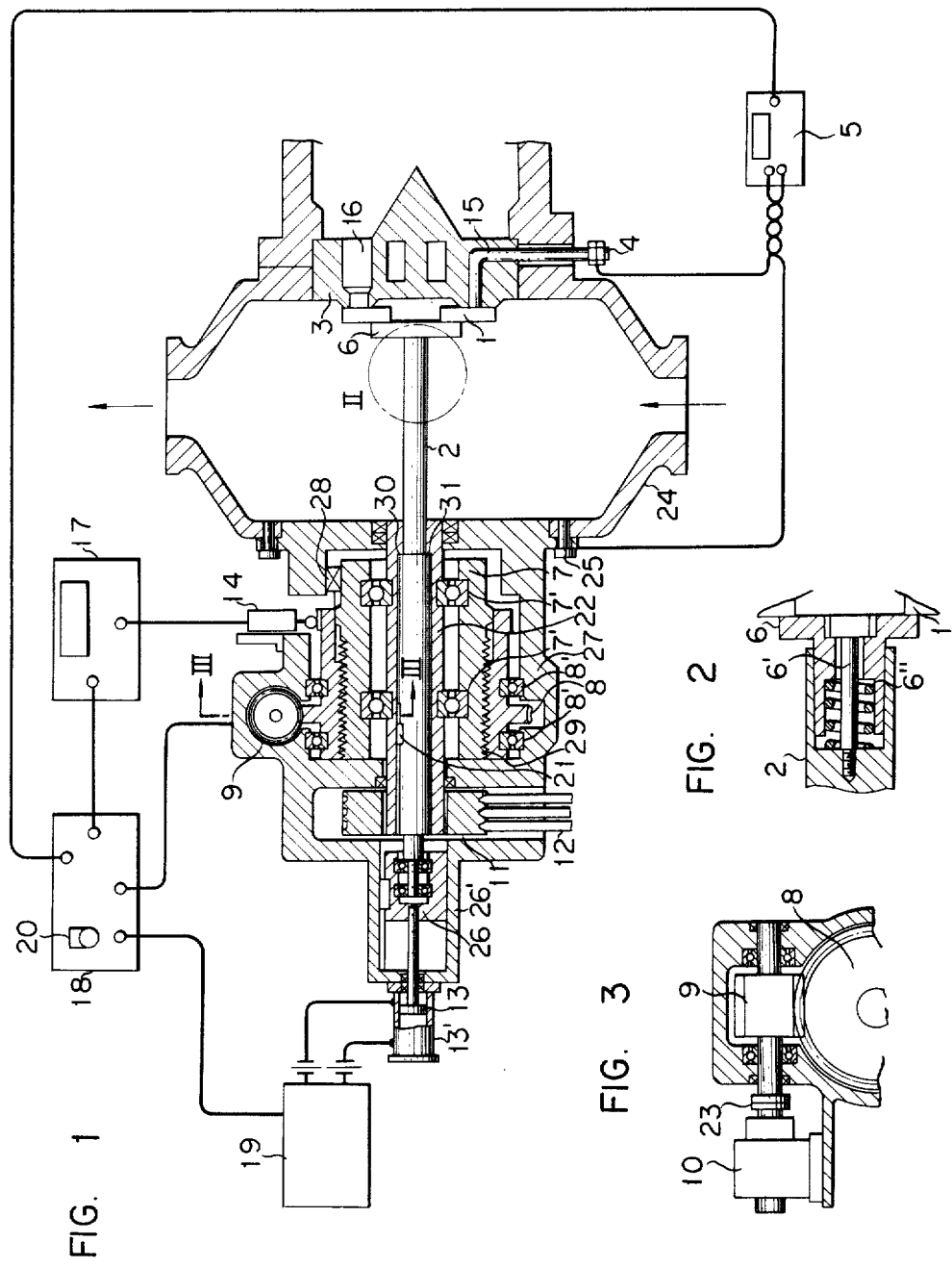

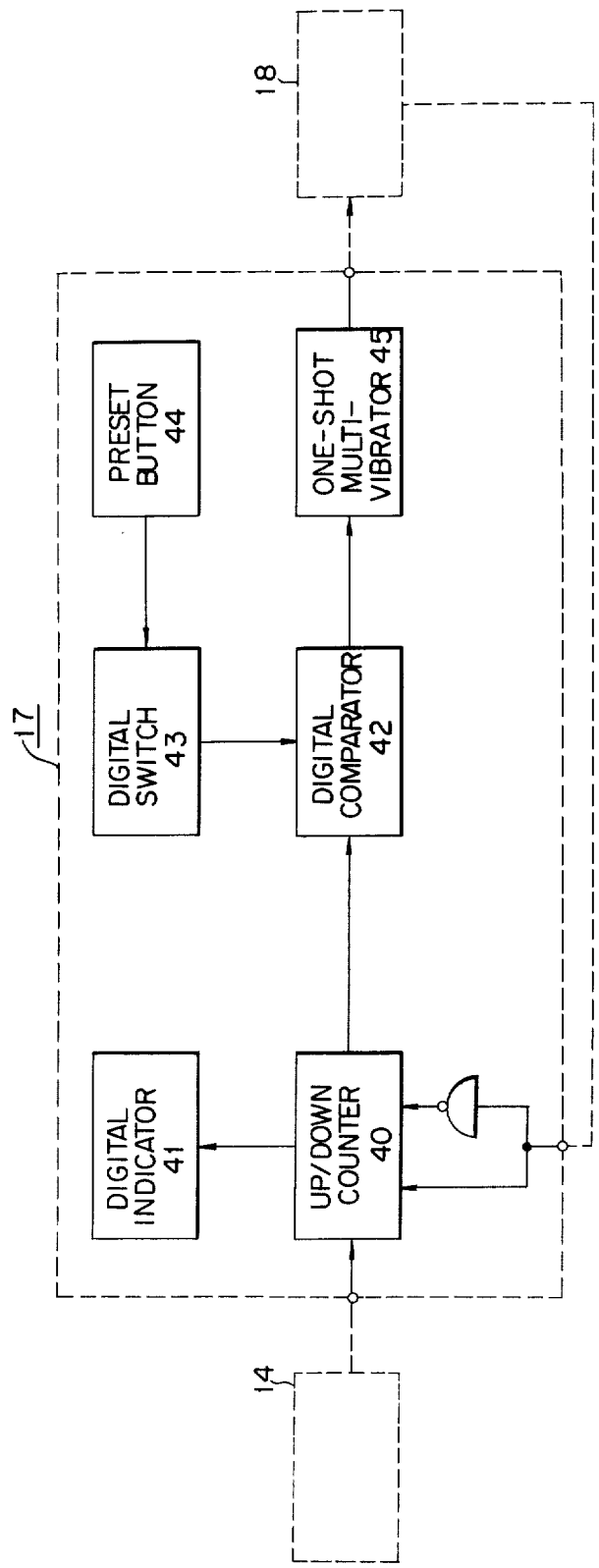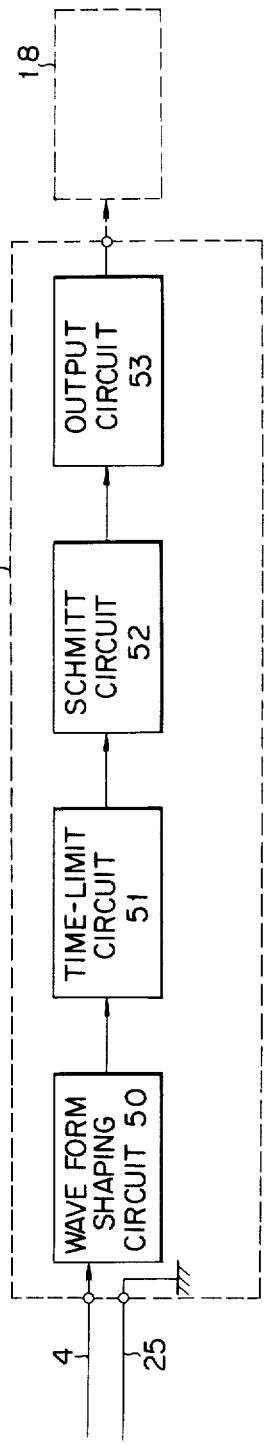

METHOD AND APPARATUS FOR ADJUSTING THE POSITION OF CUTTER BLADES RELATIVE TO A DIE IN A PLASTIC RESIN PELLETIZING APPARATUS

BACKGROUND OF THE INVENTION

The present invention relates to a method and an apparatus for controlling the position of cutter blades relative to a die in a plastic resin pelletizing apparatus and more particularly to a method and an apparatus for electrically controlling the position of the cutter blades relative to the die in a plastic resin pelletizing apparatus.

In the specification and claims the term "position of the cutter blades relative to the die" should be understood to mean not only a position of the cutter blades in front of the surface of the die with a desired gap left therebetween, but also a position of the cutter blades in contact with the surface of the die under a desired compressive force.

In a plastic resin pelletizing apparatus, since the position of the cutter blades to cut the plastic strands extruded from the die nozzles relative to the die once initially adjusted gradually varies as the operation of the cutter blades continues due to the wear of the cutting edges of the cutter blades, the dimension and shape of the pellets cut by the cutter blades gradually become irregular.

Accordingly, in order to obtain pellets of a good quality in dimension as well as shape it is necessary to continuously keep the cutter blades in a predetermined position relative to the die so that the cutter blades are always urged against the surface of the die with a predetermined pressure or with a predetermined gap being left therebetween during the operation of the pelletizing apparatus.

For this purpose there have been hitherto proposed several apparatuses which can substantially satisfy such requirements. However, since most of them operate on the basis of a mechanical principle they need very complicated mechanisms and also require constant maintenance in order to ensure the desired results. In particular an automatic adjustment of the gap between the cutter blades and the die has been practically impossible to realize with them because of the complexity of the mechanisms.

So it has long been desired in the field of the art that a method and apparatus for automatically adjusting the position of the cutter blades relative to the die be developed.

SUMMARY OF THE INVENTION

It is an object of the present invention to provide a method for adjusting the position of the cutter blades relative to the die in a plastic resin pelletizing apparatus which can automatically maintain the cutter blades at a predetermined position relative to the die regardless of the wear of the cutting edges of the cutter blades during the operation of the pelletizing apparatus.

It is another object of the present invention to provide a method for adjusting the position of the cutter blades relative to the die in a plastic resin pelletizing apparatus which electrically maintains the cutter blades at a predetermined position relative to the die regardless of the wear of the cutting edges of the cutter blades during the operation of the pelletizing apparatus.

It is a further object of the present invention to provide a method for adjusting the position of the cutter blades relative to the die in a plastic resin pelletizing apparatus which allows automatic adjustment of the relative position between the cutter blades and the die in order to continuously manufacture plastic pellets having good quality in dimension as well as shape over a long operation time of the pelletizing apparatus.

It is a still further object of the present invention to provide an apparatus for carrying out the method.

According to the present invention a method is provided for adjusting the position of the cutter blades relative to the die in a plastic resin pelletizing apparatus in which the cutter blades are advanced towards the die while they are rotating and when they come into contact with the surface of the die, electrical signal pulses are issued, which in turn make the cutter blades move further forward or rearward until a predetermined position is established between the cutter blades and the die.

In accordance with the present invention an apparatus is provided for adjusting the position of the cutter blades relative to the die in a plastic resin pelletizing apparatus which comprises cutter blades resiliently mounted to one end of a cutter shaft, means for advancing the cutter shaft towards the die at a relatively slow speed, electrode means to detect the contact of the cutting edges of the cutter blades with the die, signal transducer means to produce electrical signal pulses upon actuation of the electrode means, detecting means to measure the axial movement of the cutter shaft upon receipt of the electrical signal pulses from the signal transducer means, and setting means to previously set the desired position of the cutter blades relative to the die which operates to stop the movement of the cutter shaft in cooperation with the detecting means when they detect that the cutter shaft has moved a predetermined distance.

BRIEF DESCRIPTION OF THE DRAWINGS

Other objects and advantages of the present invention will become apparent from the following description taken in connection with the accompanying drawings which are set forth by way of illustration and example of one embodiment of the present invention, where:

FIG. 1 is a diagrammatical view, partially in section, of one embodiment of the apparatus according to the present invention;

FIG. 2 is a partial sectional view of the portion encircled by the dot-dash line II of FIG. 1;

FIG. 3 is a cross-sectional view of the embodiment shown in FIG. 1 taken along the line III—III of FIG. 1;

FIG. 4 is a typical block diagram of the setting device for the number of revolutions;

FIG. 5 is a block diagram of an example of the signal transducer shown in FIG. 1.

DESCRIPTION OF THE PREFERRED EMBODIMENT

Figure 6:
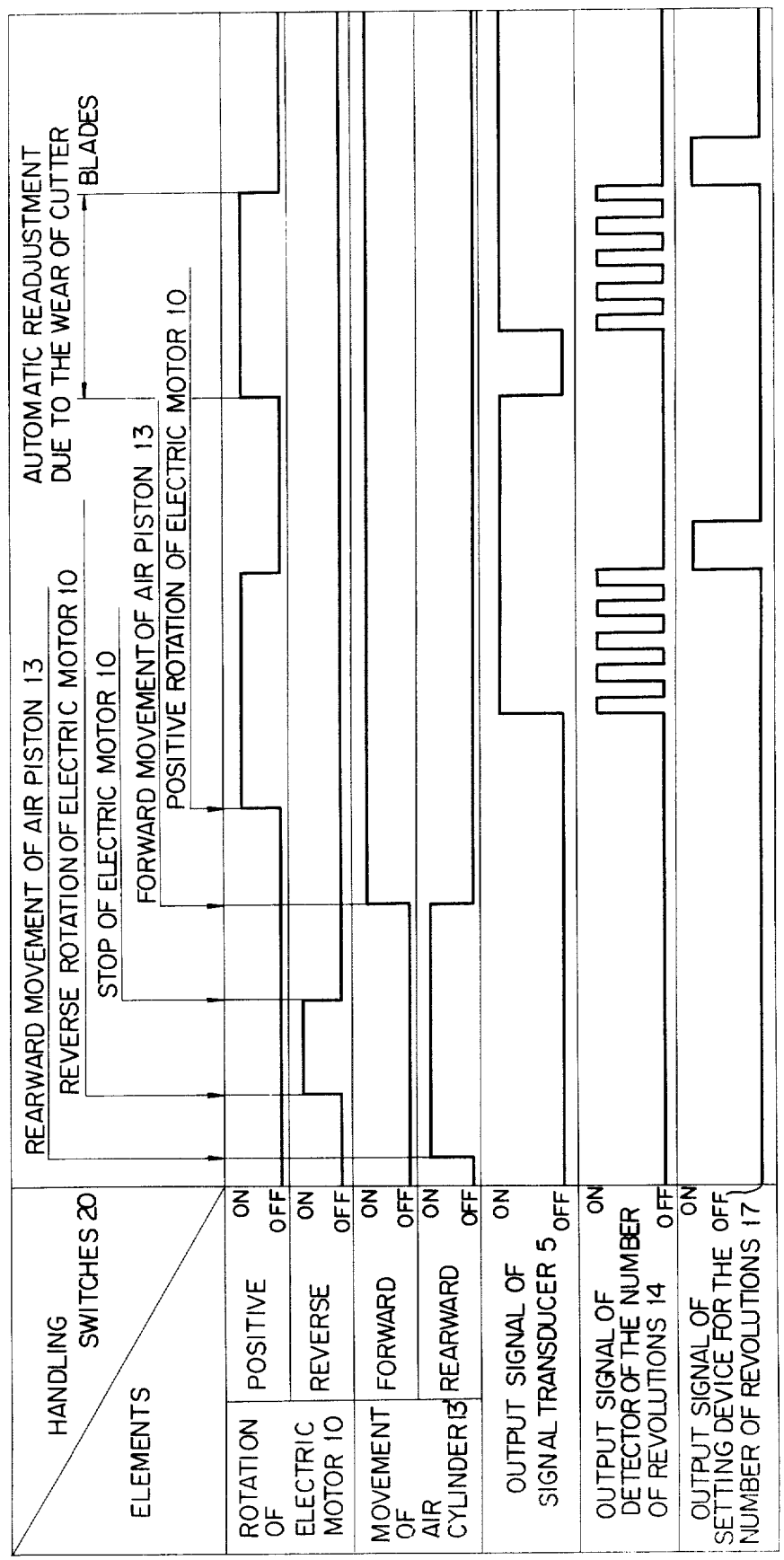
FIG. 6 is a typical time flow chart of the operation of the apparatus shown in FIGS. 1 to 3.

Referring now to FIGS. 1 and 3 of the drawings, the reference numeral 1 shows a number of cutter blades the cutting edges of which serve to cut melted synthetic resin strands extruded through die nozzles 16 of a die 3 of a plastic resin extruder. The cut melted synthetic resin strands are discharged in the stream of pellet conveying water flowing upwardly through an under-water cutting box 24 of a pelletizing apparatus to be cooled by the surrounding water and thus solidified into pellets.

The cutter blades 1 are secured to a cutter holder 6 on the surface confronting the surface of the die 3 by any suitable means. The cutter holder 6 is in turn mounted on a cutter shaft 2 at one end by inserting the hollow cylindrical shaft of the cutter holder 6 in the cylindrical recess formed in the cutter shaft 2 and securing the cutter holder 6 by a set screw 6' passed through a bore formed centrally in the cutter holder 6, whereby the cutter holder 6 is axially slideably mounted in the recess of the cutter shaft 2 and is usually resiliently held at its forward end position by a coil spring 6" interposed between the bottoms of the recess of the cutter shaft 2 and a larger bore formed centrally in the cutter holder 6 in communication with the bore which holds the set screw 6', whereby the axial movement of the cutter holder 6 towards the die 3 is limited by the head of the set screw 6' as shown in FIG. 2.

The cutter shaft 2 is supported within a cutter shaft bearing sleeve 22 and operatively connected to it through a slide key 21 and a key groove so as to be rotated therewith and at the same time is adapted to be shiftable axially relative to the cutter shaft bearing sleeve 22 when a thrust bearing block 26 rotatably journalling its other end, i.e., remote from the cutter holder 6, is shifted. The thrust bearing block 26 is slideably mounted in a cylinder 26' integrally formed on one end of a gear casing 27, fixedly secured to the under-water cutting box 24, and it is also fixedly connected to a piston 13 of an air cylinder 13' through its piston rod which passes through the end wall of the cylinder 26', whereby the air cylinder 13' is fixedly secured to the end wall of the cylinder 26'.

When the piston 13 is moved toward the die 3 by the action of the air cylinder 13' the cutter holder 6 is moved toward the die 3 through the thrust bearing block 26 till shoulder 30 of the cutter shaft 2 abuts against shoulder 31 formed on the sleeve 22 near the end remote from the thrust bearing block 26.

The cutter shaft bearing sleeve 22 is rotatably mounted within an intermediate bearing sleeve 7, having generally a hollow cylindrical form, by means of a pair of ball bearings 7'. The intermediate bearing sleeve 7 is mounted within a cylindrical space formed in the gear casing 27, provided with two parallel end walls, and has a shorter length than the distance between the two end walls of the cylindrical space leaving a gap between them whereby the intermediate bearing sleeve 7 is connected to the gear casing 27 through the engagement of a key 28 and a key groove so as to allow the intermediate bearing sleeve 7 to shift axially with its rotation being prevented by the key 28. The intermediate bearing sleeve 7 is provided with a fine male screw thread 29 on its outer periphery to be meshed with a corresponding female screw thread formed on the bore of a cylindrical boss of a worm wheel 8 which is rotatably mounted within the cylindrical space through a pair of ball bearings 8'. The worm wheel 8 meshes with a worm 9 rotatably mounted in the gear casing 27. The worm 9 is drivingly connected through a friction clutch 23 to an electric motor 10 fixedly secured to a portion of the gear casing 27 as shown in FIG. 3. The motor 10 is electrically connected to a control panel 18 to effect its operation in either direction. When the worm 9 is rotated through the friction clutch 23 by the motor 10 the worm wheel 8 is also rotated so that the intermediate bearing sleeve 7 is caused to shift axially at a relatively slow speed together with the cutter shaft bearing sleeve 22 by the screw thread engagement therebetween until the gap between the end surfaces of the intermediate bearing sleeve 7 and the surfaces of the end walls of the cylindrical space becomes null, because the rotation of the intermediate bearing sleeve 7 is prevented by the engagement of the key 28 and the key groove. In this case, however, the gap between the end surfaces of the intermediate bearing sleeve 7 and the surfaces of the end walls of the cylindrical space of the gear casing 27 is preferably selected to be about 5 mm.

The cutter shaft bearing sleeve 22 has a belt pulley 11 fixedly secured thereto at one end which is adapted to be rotated through belts 12 from an electric motor not shown in the drawing.

The relative positions of the thrust bearing block 26, the cutter shaft bearing sleeve 22 and the intermediate bearing sleeve 7 are preferably selected such that, after the motor 10 has been driven in the reverse direction till the friction clutch 23 is actuated, that is, the intermediate bearing sleeve 7 has reached its rearward limiting position to abut against the surface of the rear end wall of the cylindrical space of the gear casing 27, and the cutter shaft 2 is moved towards the die 3 through the thrust bearing block 26 by the actuation of the air cylinder 13', the cutters 1 do not come into contact with the surface of the die 3, instead a gap of about 3 mm is still left between them.

The air cylinder 13' is connected to an air pressure actuating unit 19 by suitable piping so as to be actuated under the control of unit 19, which may have any configuration known in the art, e.g., it may comprise electromagnetic valves for changing the air supplying direction, speed regulating valves, pressure regulating valves, filters, oilers, etc. That is, the air pressure actuating unit 19, supplied with pressurized air as usually available from the industrial air source in factories, serves to actuate the air cylinder 13' by changing the air passage by the action of the electromagnet valves operable in response to electrical signals from the control panel 18.

The worm wheel 8 is additionally made to cooperate with a detector 14 of the number of revolutions. It makes in such a manner that one or more projections provided on its outer periphery, e.g., at its forward portion, actuate the detector 14 every rotation or fraction thereof of the worm wheel 8 to supply an electric pulse signal to a setting device 17 for the number of revolutions through a suitable electrical connection therebetween. The detector 14 of the number of revolutions may be a commercially available approaching switch of a suitable type.

The setting device 17 for the number of revolutions is a so-called up/down preset counter and may have any configuration known in the art comprising electronic elements such as transistors, accumulating circuit elements, etc.

FIG. 4 shows a typical block diagram of the setting device 17 for the number of revolutions which mainly comprises an up/down counter 40, a digital indicator 41, a digital comparator 42, a digital switch 43, a preset button 44 and an one-shot multivibrator 45. The setting device 17 for the number of revolutions receives the electric pulse signals from the detector 14 of the number of revolutions, corresponding to the number of revolutions of the worm wheel 8 to count the electrical pulse signals, and, upon the count reaching the value previously set in it, an electrical signal is fed to the control panel 18 to stop the operation of the motor 10.

The die 3 is embedded with a number of electrodes 4 on the same circumference as the die nozzles 16 and insulated from it by insulating materials, e.g., ceramics 15, the surfaces of one end of each electrode 4 being made to be flush with the surface of the die 3, the other end being adapted to be used as the terminal for electrical wiring. The wirings from the electrodes 4 and a terminal 25 provided on the under-water cutting box 24 are paired to be connected to a signal transducer 5.

The signal transducer 5 is adapted to send continuous electrical signals to the control panel 18 only while the cutter blades 1 are in contact with the end surfaces of the electrodes 4, that is, the cutter blades 1 are in contact with the surface of the die 3.

More precisely, since the cutter blades 1 are normally rotated at a high speed by the cutter shaft 2, when the cutter blades 1 come into contact with the electrodes 4, i.e. the surface of the die 3, the electrical signals from the electrodes 4 are pulse signals. The signal transducer 5 may have any configuration known in the art, and, for instance, it may mainly comprise a waveform shaping circuit 50, a time-limit circuit 51 a Schmitt circuit 52 and an output circuit 53 as represented by the block diagram shown in FIG. 5.

The signal transducer 5 operates in such a manner that so long as the time intervals of the electric pulse signals from the electrodes 4 are less than a definite chosen time interval it issues continuously the electrical output signals, whereas when the time intervals exceed the chosen time interval it ceases to issue the electrical output signals. In other words, it transform the state of contacting of the cutter blades 1 with the die 3 into electrical signal pulses.

The control panel 18 may have any configuration known in the art, for instance, it may comprise a group of handling switches 20, display lamps, electromagnetic relays, timers, etc., and is electrically connected to the signal transducer 5, the setting device 17 for the number of revolutions, the electric motor 10, the air manipulation unit 19, etc.

In operation, in order to adjust the position of the cutter blades 1 relative to the surface of the die 3, the motor 10 is first driven in the reverse direction by the manipulation of the group of handling switches 20 of the control panel 18 to retract the intermediate bearing sleeve 7 to its rearmost position. Then the cutter blades 1 are moved towards the die 3 together with the cutter shaft 2 by forcing the piston 13 of the air cylinder 13' to shift forward through the actuation of the air pressure actuating unit 19 which is operated by the manipulation of the group of handling switches 20 of the control panel 18 while the cutter shaft 2 is driven through the cutter shaft bearing sleeve 22 to which the cutter shaft 2 is connected through the key 29 and which is driven by the belt pulley 11 connected to it and the belts 12 from the motor not shown. Thus the cutter blades 1 are moved towards the surface of the die 3 till the shoulder 30 of the cutter shaft 2 abuts against the shoulder 31 of the cutter shaft bearing sleeve 22 as abovesaid, when the cutter blades 1 are then positioned in front of the surface of the die 3 separated from it by a gap of about 2 mm.

Thereafter the rotation of the motor 10 is changed over to a positive direction by the manipulation of the group of handling switches 20 of the control panel 18 so that the worm 9 is rotated to rotate the worm wheel 8 at a relatively slow speed resulting in the forward movement of the intermediate bearing sleeve 7 towards the die 3 due to the screw thread engagement between the worm wheel 8 and the sleeve 7, but at a still lower speed. Thus the cutter blades 1 are moved towards the die 3 at this lower speed until they come into contact with the end surfaces of the electrodes 4, whereupon this condition is detected by the signal transducer 5 which issues electrical signal pulses to the control panel 18, which in turn actuates the setting device 17 for the number of revolutions to cause the detector 14 of the number of rotations to issue electrical pulse signals corresponding to the number of rotations of the worm wheel 8. Then the setting device 17 for the number of revolutions counts the electrical pulse signals from the detector of the number of rotations, and, upon reaching the value of the number of revolutions of the worm wheel 8 which has been previously set according to the desired compressive force to be applied by the blades 1 on the die 3 by the compression of the coil spring 6', the setting device 17 for the number of revolutions dispatches an electric signal to the control panel 18 to stop the running of the motor 10.

Thus the coil spring 6' provided in the cutter holder 6 is appropriately compressed to elastically urge the cutter blades 1 against the die 3 so that manufacture of pellets of a high quality can be guaranteed.

In this case, since the cutter blades 1 usually rotate at a high speed the signal transducer 5 receives from the electrodes 4 electrical signal pulses of a correspondingly short time interval below a value previously determined and the signal transducer 5 continues to send output signals to the control panel 18 so long as the cutter blades 1 are in contact with the die 3.

Thus the cutter blades 1 are set relative to the die 3 under a predetermined compressive force against it, ensuring the manufacture of pellets having excellent quality.

However, as the operation of the pelletizing apparatus continues the cutting edges of the cutter blades 1 become worn due to their friction with the surface of the die 3 till the effect of the coil spring 6' mounted in the cutter holder 6 becomes so small that the short-circuit condition between the cutter blades 1 and the electrodes 4 is also affected. Accordingly the time intervals of the electrical pulse signals dispatched from the electrodes 4 to the signal transducer 5 fluctuates and, as the wear of the cutting edges of the cutter blades 1 progresses further, ultimately the time intervals of the electrical pulse signals exceeds the time interval previously determined by the signal transducer 5 so that no output signal pulse is issued from the signal transducer 5 to the control panel 18, as a result of which the control panel 18 actuates to operate the motor 10 again in the positive direction causing the relative position of the cutter blades 1 with the die 3 be restored to the initially adjusted position by a similar procedure to that above said.

Thus, according to the present invention, once the initial condition has been established in connection with the relative position between the cutter blades 1 and the die 3, this condition is automatically maintained regardless of the wear of the cutting edges of the cutter blades 1 so that continuous manufacture of pellets of a uniform quality is guaranteed by a pelletizing apparatus operating automatically for a long time.

FIG. 6 shows a typical operation time flow chart for the present invention which indicates the operation and stop of the electrical motor 10 and the air cylinder 13' in association with the on and off of the signal transducer 5, the detector 14 of the number of revolutions and the setting device 17 for the number of revolutions in response to the position of the cutter blades 1 relative to the die 3.

Further, in the present invention, since the cutter blades 1 are made to be moved quickly towards or away from the die 3 by the operation of the air cylinder 13', the exchanging of the cutter blades 1 can be carried out quickly without interfering with the fine feeding mechanism comprising the worm 9, the worm wheel 8 and the intermediate bearing sleeve 7 operatively connected to it through the fine screw thread engagement 29.

It will also be appreciated that though the explanation for urging the cutter blades 1 towards the die 3 under a certain compressive pressure has been given above, the cutter blades 1 can be also set in front of the surface of the die 3 with a gap of a desired value, if required, by the corresponding adjustment of the setting device 17 for the number of the revolutions and the control panel 18.

While we have described and illustrated herein one preferred embodiment of our invention it will be understood that modifications and changes may be made without departing from the spirit of the present invention.

What is claimed is:

1. A method for adjusting the position of cutter blades relative to a die in a plastic resin pelletizing apparatus comprising advancing said cutter blades towards said die during the rotation of said cutter blades while they are separated from each other, detecting electrically the contact of the cutting edges of said cutter blades with the surface of said die, and applying a predetermined compressive force to said cutter blades or retracting said cutter blades by a predetermined distance upon confirming the contact of the cutting edges of said cutting blades with the surface of said die by said electrical ditection.

2. An apparatus for adjusting the position of cutter blades relative to a die in a plastic resin pelletizing apparatus comprising cutter blades resiliently secured to one end of a cutter shaft so as to be allowed relative axial movement thereto, means to rotate said cutter shaft, shifting means to shift said cutter shaft axially towards said die at a relatively slow speed, electrode means provided in said die to detect the contact of the cutting edges of said cutter blades with the surface of said die, signal transducer means to produce electrical signal pulses upon said contact of the cutting edges of said cutter blades, measuring means to measure the axial movement of said cutter shaft upon receipt of said electrical signal pulses from said signal transducer means, and setting means to set a desired axial movement of said cutter shaft, said setting means being made to associate with said measuring means to stop said shifting means when said measuring means detect the desired axial movement of said cutter shaft.

3. An apparatus for adjusting the position of cutter blades relative to a die in a plastic resin pelletizing apparatus as claimed in claim 2, wherein said cutter shaft is further provided with means for it to moves axially relative to said shifting means at a relatively higher speed.

4. An apparatus for adjusting the position of cutter blades relative to a die in a plastic resin pelletizing apparatus as claimed in claim 2, wherein said shifting means comprise an intermediate bearing sleeve rotatably supporting said cutter shaft, a worm wheel the hollow boss of which engages with the outer surface of said intermediate bearing sleeve through a screw thread engagement, a worm meshing with said worm wheel, and a prime mover to rotate said worm in either direction, whereby said worm wheel is held in the housing of said pelletizing apparatus so as to allow its axial movement, but prevent its rotation.

5. An apparatus for adjusting the position of cutter blades relative to a die in a plastic resin pelletizing apparatus as claimed in claim 2, wherein said electrode means are one or more electrodes each embedded in the body of said die on the same circumference as die nozzles of said die with one end being made to be flush with the outer surface of said die, said electrodes being electrically insulated from the body of said die.

* * * * *